Dec. 28, 1926. 1,612,105
A. M. ENGLISH
MEASURING APPLIANCE FOR PACKAGE FILLING MACHINES
Filed March 31, 1925 4 Sheets-Sheet 1
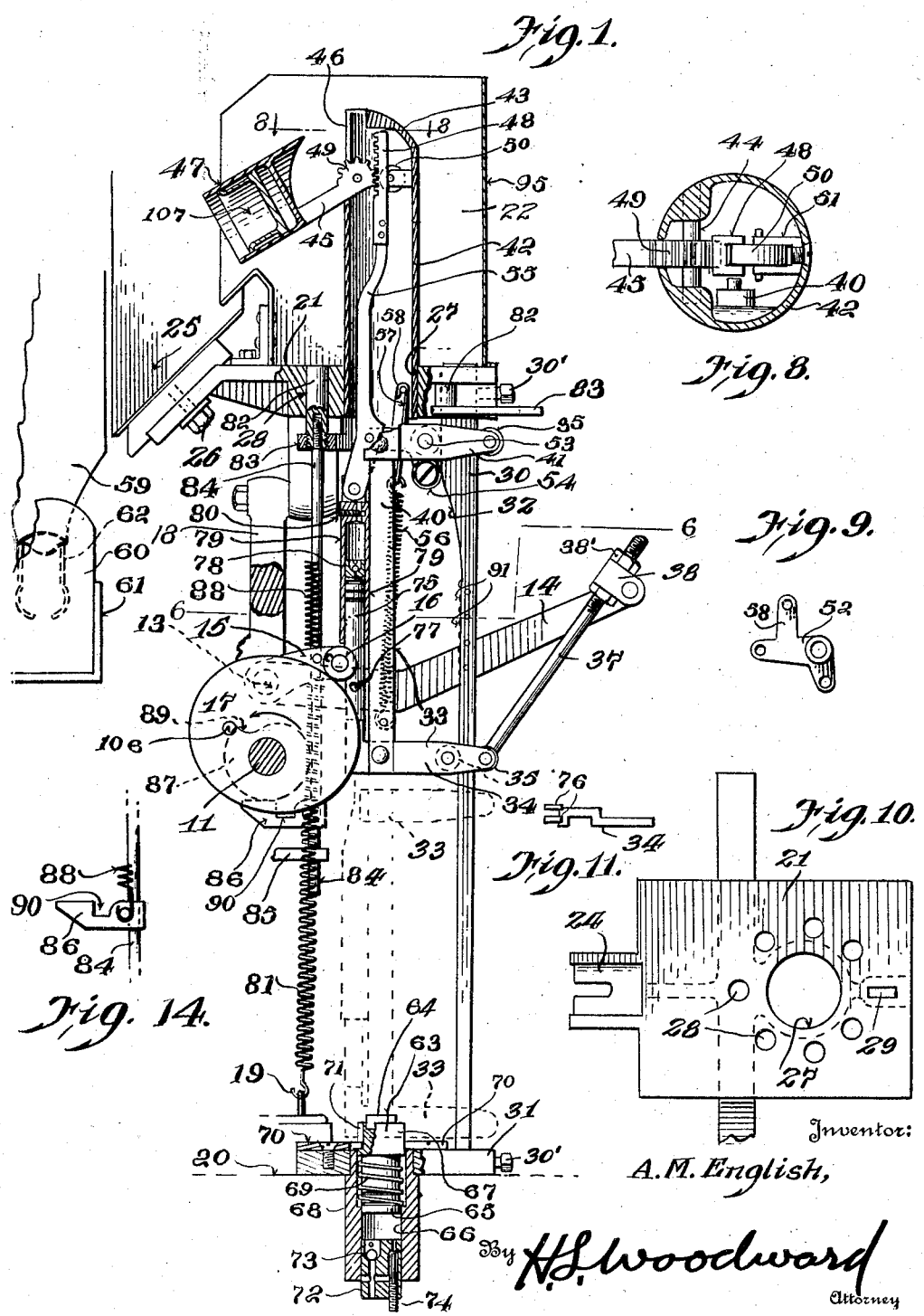

Dec. 28, 1926.  
A. M. ENGLISH  
1,612,105  
MEASURING APPLIANCE FOR PACKAGE FILLING MACHINES  
Filed March 31, 1925  4 Sheets-Sheet 2
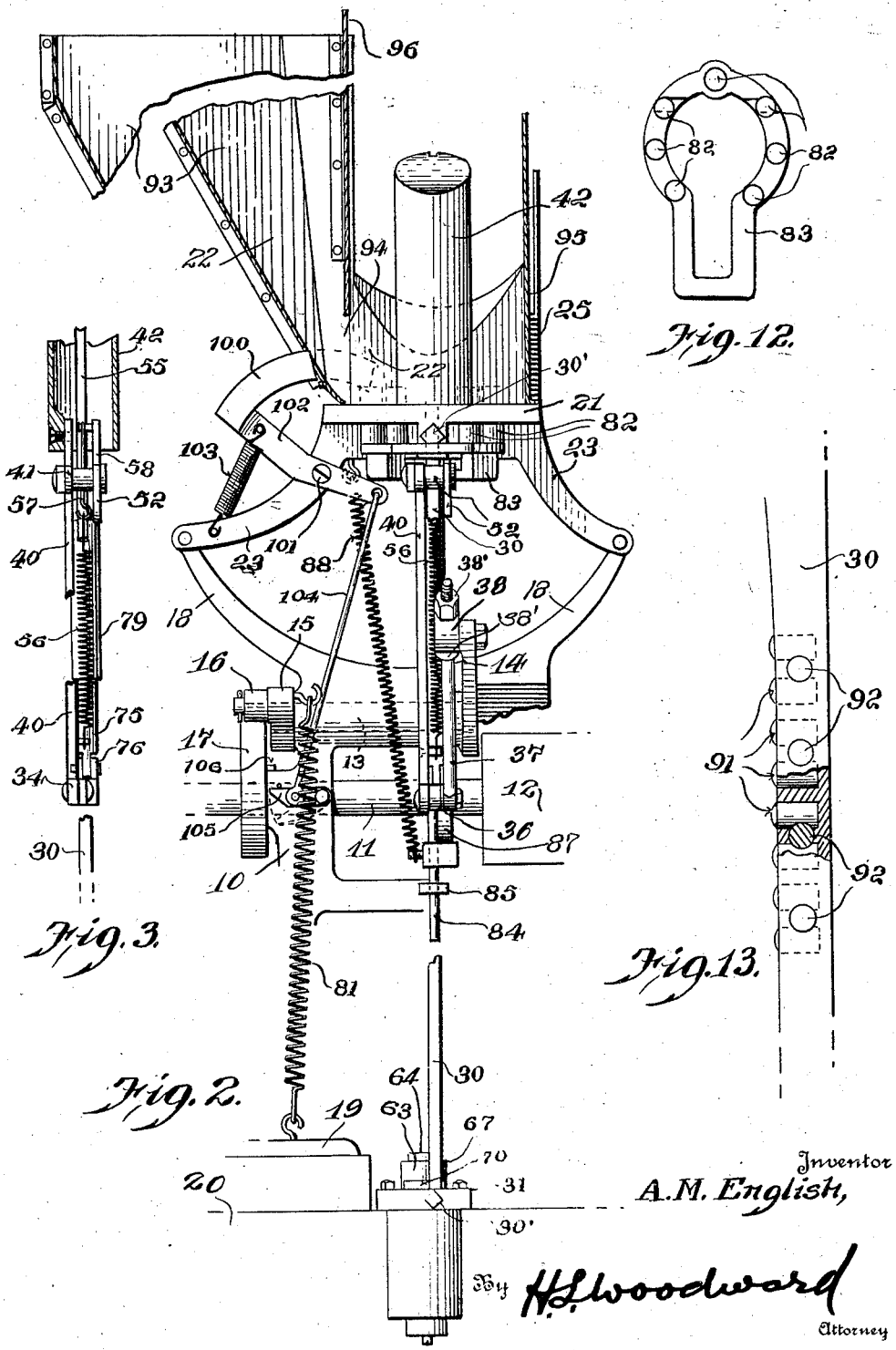
Inventor  
A. M. English,  
By H. L. Woodward  
Attorney Dec. 28, 1926.  
A. M. ENGLISH  
1,612,105  
MEASURING APPLIANCE FOR PACKAGE FILLING MACHINES  
Filed March 31, 1925  4 Sheets-Sheet 3
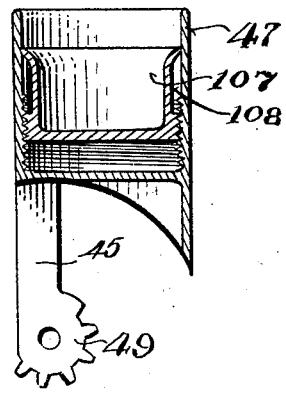
Fig. 15
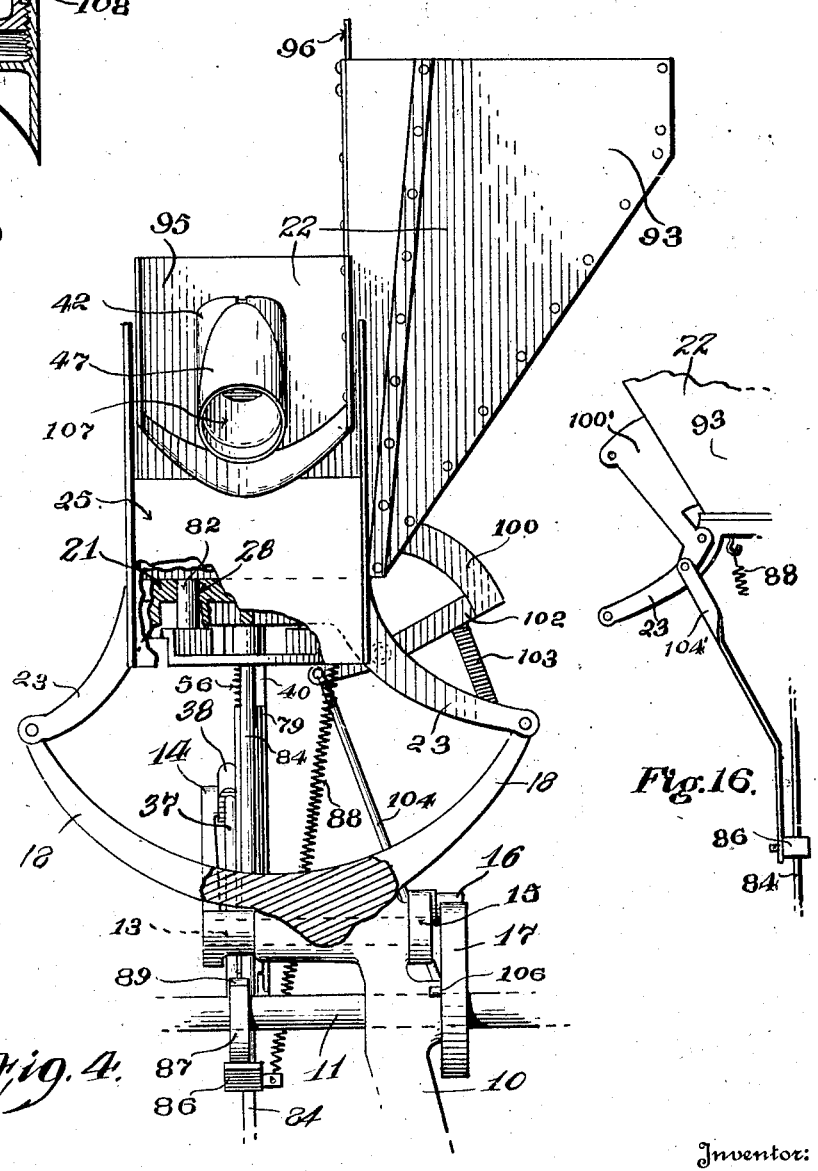
Fig. 4.  
Fig. 16.
Inventor:  
A. M. English,  
By H. S. Woodward  
Attorney

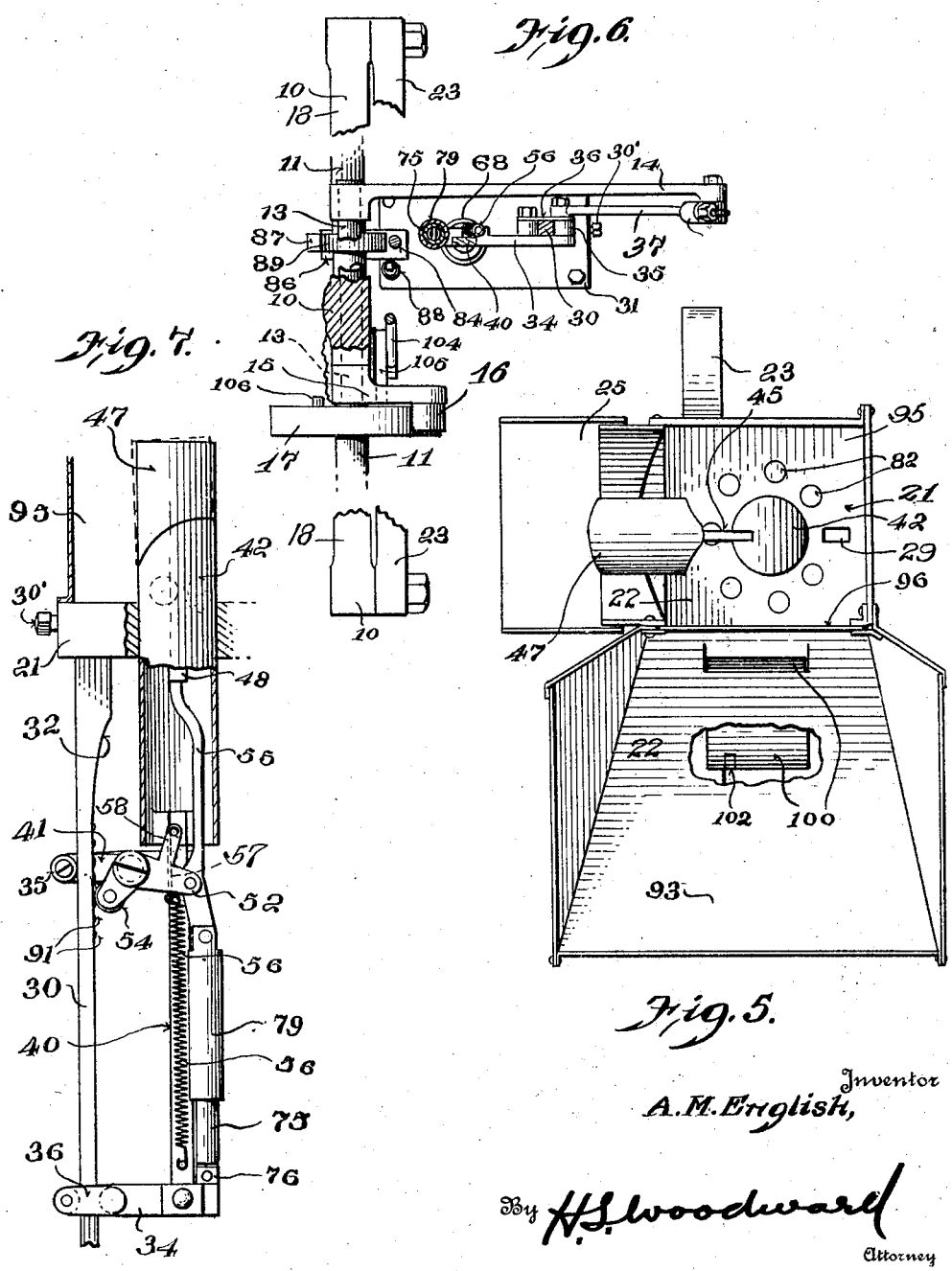

Patented Dec. 28, 1926.

1,612,105

UNITED STATES PATENT OFFICE.

ANALDO M. ENGLISH, OF BROOKLINE, MASSACHUSETTS, ASSIGNOR TO THE BROWN BAG FILLING MACHINE COMPANY, OF FITCHBURG, MASSACHUSETTS, A CORPORATION OF MASSACHUSETTS.

MEASURING APPLIANCE FOR PACKAGE-FILLING MACHINES.

Application filed March 31, 1925. Serial No. 19,721.

The invention has for an object to provide a mechanism suitable for use with bag filling machines of the general character shown in the patent to Cummings, No. 539,171, and well known in the art as the "Brown bag filling machine." This bag-filling machine includes a bag presenting, a bag opening and charge guiding means in the form of a funnel, and various charge forming elements may be mounted upon the machine to deliver charges to the funnel. It is a purpose in the present invention to provide such a charge forming element which may be attached to the regular machine, and which is especially adapted to use with more bulky articles than have heretofore been packaged with such machines. Specifically, the device is especially adapted for use with cakes, crackers, and candy, and the particular embodiment herein presented has been especially useful in handling these and other articles which do not tend to settle compactly in the measure quickly or by action of gravity alone under ordinary circumstances. It is a special aim of the invention to provide a measuring cup and means for filling this cup with articles to be measured with a minimum liability of abrasion of the articles and effect the filling of the measure without any mechanical elements other than the cup engaging the articles therein, yet attaining an accurate measurement of such articles with a low degree of irregularity in quantity, being especially advantageous where light articles are involved.

Another important aim is to provide novel means for preventing articles in hoppers from failing to move properly to the measure by reason of wedging or cohesion of the articles. A further aim is to provide a novel dash-pot construction in such appliances. It is also desired to effect the delivery of the charge from the measure with a catapulting action, insuring complete emptying of the measure at each operation and also quickening the movement of charges into bags, cartons or other receivers.

Additional objects are involved, as well as further advantages and features of novelty and invention, as may be more readily understood from the following description and accompanying drawings, wherein—

Figure 1 is a vertical transverse sectional view of the measuring apparatus as applied to one of the Brown bag filling machines, only a portion of the frame of the bag filling machine being shown, and the funnel and bag-presenting means being indicated diagrammatically, these details being well understood in the art and forming no novel details in the present invention.

Figure 2 is a rear elevation of the machine from the right hand side of Figure 1, parts being broken away to present a better view of the mechanism.

Figure 3 is a fragmentary elevational view from the same direction as in Figure 2, with further portions broken away.

Figure 4 is a front elevation of the mechanism, with parts broken away.

Figure 5 is a top view of the device.

Figure 6 is a horizontal sectional view on the line 6—6 of Figure 1, looking downwardly.

Figure 7 is a fragmentary vertical sectional view of the measuring device at an intermediate position, the view being taken from the opposite direction involved in Figure 1, in the same plane, approximately.

Figure 8 is a horizontal sectional detail of the measuring device on the line 8—8 of Figure 1.

Figure 9 is a detail elevation of the bellcrank lever.

Figure 10 is a detail top view of the base of the hopper.

Figure 11 is a detail of the lower frame piece of the carriage.

Figure 12 is a plan view of the agitator for the hopper.

Figure 13 is an enlarged detail of the jostling cams on the vertical guide and cam rod.

Figure 14 is a detail of the cam engaging arm of the bottom agitator.

Figure 15 is a detail of the measure.

Figure 16 is a detail of a modified agitator and operative connection, parts not directly involved being omitted.

There is illustrated a portion of a framing 10, supporting a main cam shaft 11, revolubly mounted thereon, upon which a regular cam 12 having functions not connected with the present device, is mounted. Above the shaft 11 there is mounted a small counter rock shaft 13, upon one end of which there is mounted an operating arm 14, by which the present mechanism is operated principally, a short arm 15 being fixed upon the opposite end of this shaft 13 carrying a wiper 16 which engages a cam 17 on the shaft 11 of proper proportion to give the desired motion to the arm 14. The frame 10 also includes two bracket arms 18 on which various charge forming devices may be mounted. All of the parts thus far described are found in the regular bag filling machine mentioned above.

There is illustrated an upper frame plate 21 serving as the bottom of a hopper 22, and having downwardly extending arms 23, the ends of which are bolted to the upper ends of the arms 18 of the regular machine. The plate has a forwardly and downwardly inclined and channelled chute supporting arm 24 longitudinally slotted, upon which a chute 25 is adjustable by means of a bolt 26 engaged through the slot of the arm 24 and clamping the latter against the base of the chute. The plate 21 is formed with a vertical circular opening 27 therein, with a number of smaller openings 28 therearound and one rectangular opening 29 at the rear part. The latter receives the upper end of a guide and cam bar 30, the lower end of which is fixed in the plate 31 secured upon the table 20. The plate 21 is thickened on the lower side around the openings 27, 28 and 29. The bar 30 is of rectilinear form and uniform dimensions throughout its lower part, but at the upper part is formed with a cam face 32 inclined inwardly and upwardly, the upper end of the bar being substantially thickened from front to rear and held in the opening 29 of the frame plate by means of a set screw 30′, a similar set screw holding the lower end of the bar in the plate 31. A vertically reciprocable carriage 33 travels throughout the length of the bar 30, and includes the lower carriage frame piece 34, upon which are mounted two rollers 35 respectively at the forward and back sides of the bar 30, as well as a retainer plate 36 extending beside the rollers opposite the piece 34. The pintle by which the outer roller 35 is mounted is utilized also as a wrist pin for a connecting rod 37, exteriorly threaded and held by nuts 38′ longitudinally adjustable in a block 38 which is pivoted upon the outer end of the arm 14, through which means the carriage is lifted. The carriage comprises further an upstanding bar 40, riveted to the piece 34 and carrying near its upper end a top carriage frame plate 41, corresponding to the one 34, but carrying directly only one guide roller 35 which is at the outer side of the bar 30. It may also be noted that the frame piece 34 is offset toward the inner side, to permit mortising of the bar 40 therein, while the upper piece 41 is offset toward the outer side for the same purpose, the bar in each instance lying in a plane with the rear parts of the pieces 34 and 41. The bar 40 extends upwardly a short distance further and has fixed thereon the hollow cylindrical piston 42, which is snugly and slidably fitted in the opening 27, projecting some distance above the plate 21 when at the upper limit of its movement, as shown in Figure 1. The upper end of the piston is closed by a head 43, the outer face of which comprises a segment of a cylinder concentric with a horizontal pin 44 mounted adjacent the front side of the piston. On this pin there is mounted for oscillation an arm 45 movable in a slot 46 on the front side of the piston, the arm 45 being shaped and movable to lie extended longitudinally of the piston so as to close the slot 46 at times and aline with the piston. It carries at its upper end a measuring cup 47 of cylindrical form and the same diameter as the piston, its lower end terminating on the same radius as the head 43 of the piston, so that when the arm 45 is moved to inward position the cup will form a continuation of the piston, and may drop into the opening 27 to permit material in the hopper to fall into the cup. The cup is moved to discharge position as shown in Figure 1, as it reaches the upper limit of its movement, by means of a rack 48 longitudinally slidable in the piston and meshed with a gear segment 49 formed on the stem 45 concentric with the mounting pin 44. The rack 48 is channelled and supported in proper engagement with the segment 49 by means of a roller 50 tracking in the channel and having trunnions set in open slots at the inner ends of the arms of a U-shaped bracket 51 fixed within the piston at the rear side. Movement of the rack 48 is accomplished by operation of a bell-crank lever 52 mounted upon a pintle 53 fixed in the upper carriage frame piece 41 just within the bar 30. It has a downwardly extending arm provided with a wiper 54 which engages the inner face of the bar 30, and a laterally extending arm pivotally connected to a bar 55 rigidly attached to the lower end of the rack 48 to operate the latter. The wiper 54 is held in proper bearing with the bar 30 by means of a contractile spring 56, the upper end of which is connected by a short link 57 to an extension 58 on the upper side of the bell crank lever 52. The lower end of the spring 56 is connected to a pin in the bar 40 of the carriage. A main contractile spring 81 is anchored below at 19 (Figs. 1 and 2) connected at its upper end to the arm 15 to return the carriage to lowermost position.

With the apparatus described, the carriage will be reciprocated between discharge position shown in full lines in Figure 1, and loading position indicated in dotted lines in Figure 1, under rotation of the cam 17, in the direction of the arrow shown in Figure 1. As the piston moves downwardly—the wiper 54 following the cam face 32 of the bar 30—the bell crank lever 52 will draw the arm 55 downwardly, operating the cup to move it into erect position in alinement with the piston, in time to move properly into the opening 27 and receive a charge of the material in the hopper. As the carriage moves to uppermost position the cam face 32 moves the bell crank lever 52 upwardly and quickly throws the cup 47 to the position shown in Figure 1, effecting a catapulting discharge of the material in the cup through the chute 25 into the funnel 59.

To prevent shock to the parts from abrupt stoppage of the carriage at the lower limit of its movement, a dash-pot 68 is provided in the plate 31, the dasher 63 of which is provided with a rubber cushion 64 in the upper side upon which the lower end of the carriage frame 34 engages. The dasher includes a piston portion 65 fitted snugly in a cylinder 66, and a cylindrical head portion 67 fitted in a corresponding enlargement of the cylinder, a helical spring 69 being confined between the head and the shoulder at the inner end of the enlargement of the cylinder. The piston 65 is checked at the outer limit of its movement by plates 70 having tongues engaged in slots 71 in respective sides of the head of the dasher. The lower end of the cylinder is closed by a block 72 longitudinally adjustable therein, which block is provided with an inlet port and check valve 73 and a vent port and vent-regulating screw 74, the function of which will be readily understood.

It is desirable also to cushion the movement of the cup on the piston 47, in its return to initial position especially. For this purpose, an upstanding piston 75 is pivoted between ears 76 at the inner end of the lower carriage frame piece 34 beside the bar 40, an inlet port 77 opening from one side thereof through the inner end of the piston, where a check valve 78 is provided. This piston is slidable in a cylinder 79 the upper end of which is pivoted on the lower end of the bar 55 by which the rack 48 is operated. A vent and regulating screw are provided at the upper end of the cylinder as at 80 in Figure 1.

For insuring proper movement of stock in the hopper into the cup 47 when at the lower limit of its movement, a series of plungers 82 are slidably mounted in the openings 28 of the frame plate 21. These are all connected at their lower ends to an agitator frame 83 shown in Figure 12, the forward part of which is offset downwardly so that it may operate below the thickened part of the plate, the remainder of the frame 83 being disposed above this level, whereby interference with the parts on the carriage is avoided. The forward opening 28 is formed in a thickened part of the plate 21 and into the lower end of the long plunger 82 in this opening there is screwed an operating rod 84 extending downwardly, its lower end being slidable in a stationary guide-block 85. Above the guide-block 85 there is fixed on the rod 84 a wiper arm 86 engaged from above by a cam 87 on the shaft 11, the wiper being held against the cam by means of a spring 88 connected to a pin inserted through the arm 86, the other end of the spring being anchored on the plate 21, as seen in Figures 2 and 4. The cam 87 is provided with a major portion of concentric form, a drop or recess 89 being formed therein at one point, and the wiper is formed with a recess 90 so that when the drop extends past the high part of the shoe, the high part of the cam may enter the recess 90 and the spring 88 may draw the rod 84 and assembly upwardly, forcing the plungers above the plate 21 and jarring the contents of the hopper. This action occurs when the carriage reaches the lower part of its movement.

Coacting with the plungers 82 for movement of stock in the hopper toward the measuring cup, as may be found especially desirable in case the articles to be measured become very sticky, I have provided a feeder agitator or plunger 100, shown in Figures 2, 4 and 5, operating through the lower part of the receiving portion 93 of the hopper, which is located to one side of the plate 21, the stock to be measured being introduced into the receiving portion, and admitted over the plate 21 through an adjustable opening at 94 to a rectangular box-like portion 95 over the plate 21. This box 95 is of low altitude, so that an operator may gain access directly to the parts therein with a minimum of difficulty. The front side is lower than the other sides so as to permit the movement of the cup 47 freely to discharge position, permitting the cup to be inclined downwardly at the completion of its discharge movement. The size of the opening 94 may be regulated by means of a vertically adjustable plate 96 forming the partition between the receiving portion of the hopper and the box 95. The feeder agitator 100 is mounted beneath the receiving portion 93 of the hopper so as to move across the portion 93 and through the opening 94 toward the opening 27. It consists of a block of suitable material of curved form, concentric with a pivot screw 101 by which a lever 102 carrying the block 100 is pivoted on the side of the arm 23 of the frame plate 21. A spring 103 holds the device yieldingly in retracted position, as shown. The lever 102 projects inwardly beyond the pivot and has a link 104 connected thereto extending downwardly and connected medially to a lever 105, one end of which is pivoted on the frame 10 adjacent the shaft 11, with its opposite end projected toward the cam 17 and very close thereto. A pin 106 is carried by the cam 17 in position to strike the lever 105 and move it downwardly for operation of the feeder 100 immediately after operation of the plungers 82.

To insure proper settling of the charge in the cup and levelling thereof to some extent, means is provided for oscillating the cup in its upward movement, just prior to its final discharge movement. The cup oscillating means consists of a number of pins 91 set in the bar 30, having rounded ends exposed on the same side of the bar with said cam face and projecting slightly, as shown. These are retained in pairs by means of pins 92 inserted through the rod 30 crosswise of the pins 91 which are recessed to receive the pins 92 as shown. As the roller 54 travels over the projections of the pins 91 it is rapidly raised and lowered, causing a consequent rapid oscillation of the cup and the settling of its contents, as will be readily understood.

In operation, a quantity of stock having been introduced into the receiving portion 93 of the hopper, it will be admitted through the opening 94 to the box 95, and upon operation of the mechanism permitting movement of the carriage 33 to its lowermost position the plungers 82 will agitate the contents of the box and the feeder 100 will thrust material inwardly over the opening 27 whereby the cup 47 will be filled. The cam 17 will shortly thereafter have moved to a position where it will raise the arm 14 (through the wiper 16, arm 15 and shaft 13), raising the cup through the stock which may be within the box 95, and when near the upper limit of movement of the piston the roller 54, travelling over the exposed portions of the pins 91 will jostle the cup by lateral oscillation, causing settling of the contents, and permitting articles above the cup to settle thereinto, as well as shaking off any portion in excess of a predetermined average, in case the settling does not accommodate all of the material heaped upon the cup. The roller 54 then engages the inclined cam surface 32, causing movement of the cup toward discharge position, which movement begins gradually and is accelerated for the catapulting action before indicated. Continued rotation of the cam 17 permits return movement of the carriage downwardly, the roller 54 travelling rapidly downward on the cam face 32 with consequent movement of the cup 47 to initial position as the piston 42 continues its downward movement. Undue shock in stoppage of the cup at its initial position is prevented by the action of the piston 75 in the cylinder 79, these two elements comprising a dash-pot. The carriage 33 at the lower limit of its movement engages the cushion 64 of the lower dash-pot 68.

The cup 47 is constructed to permit its adjustment to vary the measure by the provision of an inner bottom portion 107, the interior of the cup being threaded at the inner part and the member 107 being adapted to screw thereinto to vary the depth of the cup. The bottom 107 in the present instance has side portions 108 extended beyond the threads of the cup and turned outwardly to lie snugly adjacent the inner perimetric surface of the cup, whereby damage of the contents of the cup by the threads will be guarded against.

In the Brown bag filling machine above mentioned, as is well understood, the shaft 11 is a regular feature, moving in synchronism with the funnel device 59, so that for the operation of the present mechanism in coordination with the regular machine, it is only necessary to position the cams 26 and 87 properly on the shaft 11. The stroke of the piston 42 may be regulated to insure its full upward movement or to guard against excessive movement upwardly by means of the nuts 38' screwed upon the link 37, the nuts engaging the opposite sides of the block 38. Bags 60 are positioned to receive the funnel by means of a bag presenting device diagrammatically indicated at 61, and a bag opening device 62 cooperates with the funnel 59.

In Figure 16 there is shown an agitator 100' which has been used successfully in the hopper, which operates with a movement similar to that of the agitator 100, and is similarly mounted. It is provided with an arm below its pivot extending laterally outward from the machine and connected at its extremity by a link 104' to the wiper 86, whereby the same cam 87 and spring 88 that operate the plungers 82 also will operate the agitator 100'. When the notch 90 of the wiper 86 alines with the high part of the cam the spring 88 acts to move the agitator 100' inward through the side of the hopper, jostling the contents and forcing them toward the measure.

I claim:

1. In a hopper device comprising a container arranged and constructed to deliver stock medially through the bottom, a measure movable to receive stock so delivered, means to operate the measure, plungers mounted for movement from without the container to a position therewithin when said measure is in receiving position, a hopper portion having lateral communication with the container at its lower part, one of said plungers being of substantial size and movable across the lower part of the hopper toward the said container for the purposes described.

2. In a device of the character described, a hopper, a guide, a carriage reciprocable on the guide toward and from the hopper, a piston on the carriage movable into the hopper and having a measure receptacle at the extremity thereof mounted for lateral movement on the piston, a cam being included beside the path of the carriage, a rocker element on the carriage having a wiper engaging the cam, means to reciprocate the measure and operative connections between the rocker element and the measure.

3. The structure of claim 2 in which the guide is formed with a lower rectilinear part, and formed at the upper part to constitute said cam.

4. The structure of claim 2 in which the guide is of rectilinear form at the lower part and is thickened at its upper part to form said cam element, said rocker element comprising a spring-pressed cranked lever pivoted on the carriage having said wiper thereon to engage the guide for guidance of the carriage and actuation by said cam, and a bearing element on the carriage engaging the guide opposite the wiper.

5. The structure of claim 2 in which the guide is of rectilinear form at the lower part and is thickened at its upper part to form said cam element said rocker element comprising a spring-pressed bell crank lever, said wiper engaging the guide, and a multiplicity of cam elements on the guide below said first named cam element and of slight altitude, to engage said wiper for jostling of the measure.

6. In a machine of the character described, a container for materials to be measured, a measure receptacle open at the upper side, means to move the measure upwardly through the container, to effect discharge of the measure, and means to jar the measure during upward movement in the container, whereby to settle material in the measure, and to dislodge excess.

7. The structure of claim 2 in which the measure has a stem pivoted on the piston, a gear segment on the stem concentric with its pivot, a rack meshed therewith longitudinally reciprocable in the piston, and means to operate the rack.

8. In a measuring device, a carriage element and a measure supported thereby mounted for movement with the carriage to and from receiving position and having relative movement for discharge of contents by a catapulating action, means to operate the carriage and the measure, and a dash pot having one element mounted on the carriage and the other connected to the measure.

9. In a device of the character described, a tiltable measure having a gear segment in the plane of tilting movement, a rack meshed therewith, a dash pot having one element pivotally connected to an extension of the rack and its other element pivotally supported, a lever pivotally connected with the rack and means to oscillate the lever to operate the rack.

10. In a device of the character described, a vertical guide, a carriage reciprocable thereon, a hopper above the path of the carriage, a piston on the carriage movable into the hopper, a tiltable measure on the upper end of the piston to aline with the piston at one limit of its movement and having a gear segment within the piston, a rack longitudinally slidable in the piston meshed with the gear and mounted for sliding and pivotal movement upon the gear, a cam beside the path of the carriage, a spring-pressed bell crank lever pivoted on the carriage for oscillation in the plane of oscillation of the rack, having a wiper engaging the cam and being pivotally connected to the rack, and a dash pot having one element pivoted on the carriage and the other pivoted on the rack.

11. The appliance of claim 10 in which the guide is formed with a thickened part as the cam, and is provided with a lower rectilinear part, and a multiplicity of pins set in the rectilinear part having ends exposed to engage the wiper for limited oscillation of the measure.

12. In a device of the character described, a hopper having an opening in the bottom thereof, a measure slidable therethrough from below to a point above the level of stock for discharge, means to move stock toward said opening and separate means to jostle stock immediately adjacent said opening, comprising a multiplicity of plungers slidable through the lower part of the hopper arranged around said opening, and means to operate the plungers when the measure is in receiving position constructed to move said plungers a comparatively slight distance into the hopper and out of the hopper.

13. The device of claim 12 in which certain plungers are mounted on a common frame, an operating rod engaged therewith, a wiper arm on the rod having a high part and a recessed part, a spring engaging the plunger and rod assembly tending to project the plungers into the hopper, and a rotating cam engaged with the arm in opposition to the spring, shaped to permit movement of the plungers by the spring.

14. The device of claim 12 in which the hopper has a box portion for holding a limited amount of stock, and a major lateral part having communication with the box portion at the lower part one of the plungers comprising a body slidable through the side of the lateral part of the hopper toward the box portion.

15. In a device of the character described, a hopper having a funnel-shaped receiving portion, a box portion having lateral communication with the receiving portion at the lower part only, the box portion having a central measure-loading opening, a curved plunger having pivotal mounting below the hopper, the plunger being concentric with its pivot and slidable through the side of the receiving part of the hopper toward the box portion, and means to oscillate the plunger.

16. In a device of the character described, a hopper including a box portion and a receiving portion leading thereinto at one side, a pivoted plunger having an outer curved part concentric with its pivot and slidable into the hopper through the receiving portion toward the box and means to operate the plunger.

17. In a device of the character described, a tiltable measure having a gear segment in the plane of tilting movement, a rack meshed therewith, a roller mounted with its periphery arranged to engage upon the rack opposite the gear segment to support the rack in engagement with the gear segment, and means to operate the rack.

18. In apparatus of the character described, a measure carrying carriage, means to operate the carriage, a dash-pot having one element stationary and the other connected to said carriage, a measure mounted upon the carriage for movement from a receiving position to discharge position on the carriage, means to operate the measure, and a dash-pot having one element operatively associated with the carriage and the other connected to the measure.

In testimony whereof I affix my signature.

ANALDO M. ENGLISH.